(12) United States Patent
Ilton

(10) Patent No.: US 8,006,396 B2
(45) Date of Patent: Aug. 30, 2011

(54) MEASURING DEVICE FOR MEASURING DEVIATION OF BODY AND METHOD THEREOF

(76) Inventor: Donald Ilton, Gravenhurst (CA)

( * ) Notice: Subject to any disclaimer, the term of this patent is extended or adjusted under 35 U.S.C. 154(b) by 0 days.

(21) Appl. No.: 12/548,473

(22) Filed: Aug. 27, 2009

(65) Prior Publication Data

US 2010/0050449 A1    Mar. 4, 2010

Related U.S. Application Data

(60) Provisional application No. 61/190,736, filed on Sep. 2, 2008.

(51) Int. Cl.
*G01C 9/00* (2006.01)
(52) U.S. Cl. ............................................. 33/301; 33/304
(58) Field of Classification Search .................... 33/375, 33/379, 383, 301, 304
See application file for complete search history.

(56) References Cited

U.S. PATENT DOCUMENTS

| | | | |
|---|---|---|---|
| 857,688 A | 6/1907 | Thorburn | |
| 1,612,843 A * | 1/1927 | Timmis | 33/371 |
| 2,154,625 A * | 4/1939 | Kleineschay | 33/375 |
| 2,521,525 A * | 9/1950 | Krausser | 33/375 |
| 2,689,412 A * | 9/1954 | Young | 33/375 |
| 2,743,528 A * | 5/1956 | Posthauer, Sr. | 33/375 |
| 3,222,794 A * | 12/1965 | MacMillan et al. | 33/336 |
| 4,934,706 A * | 6/1990 | Marshall | 33/383 |
| 5,506,759 A * | 4/1996 | Shirai et al. | 33/379 |
| 7,086,166 B2 * | 8/2006 | Helda et al. | 33/375 |
| 2005/0252016 A1 * | 11/2005 | Helda et al. | 33/375 |
| 2009/0113733 A1 * | 5/2009 | Hale | 33/375 |

* cited by examiner

*Primary Examiner* — Yaritza Guadalupe-McCall
(74) *Attorney, Agent, or Firm* — Jay Schloff

(57) ABSTRACT

A measuring device, for measuring a deviation of a body to determine an amount of shimming requisite for the body, includes an elongated member, a level indicating member, a gauge member and a jack screw member. The level indicating member is disposed on the elongated member. The gauge member is disposed on the elongated member, and the jack screw member is disposed adjacent to the gauge member on the elongated member. The elongated member may be placed on the body for measuring the deviation of the body to determine the amount of shimming requisite for the body. The jack screw member is capable of adjusting the elongated member on the body until the level indicating member indicates a horizontal orientation of the elongated member on the body. The gauge member is capable of measuring the deviation of the body, at the horizontal orientation of the elongated member on the body.

6 Claims, 3 Drawing Sheets

MEASURING DEVICE FOR MEASURING DEVIATION OF BODY AND METHOD THEREOF

CROSS-REFERENCE TO RELATED APPLICATIONS

The present disclosure claims priority under 35 United States Code, Section 119 on the U.S. Provisional Patent Application No. 61/190,736 filed on Sep. 2, 2008, the disclosure of which is incorporated by reference.

FIELD OF THE DISCLOSURE

The present disclosure generally relates to measuring devices, and more particularly, to a measuring device for measuring a deviation of a body, such as a machine surface, a base plate, a sole plate and the like, to determine an amount of shimming requisite to the body, and a method thereof.

BACKGROUND OF THE DISCLOSURE

Various measuring devices are employed to measure and compare a deviation of a body, such as a machine surface, a base plate, a sole plate and the like. For example, a spirit level is designed to determine a horizontal position or an inclined position of a body on which the spirit level is placed. Generally, the spirit level includes a transparent vial having liquid, such as colored spirit, partially filled therein so that an air bubble is created in the transparent vial. During utilization, the spirit level is placed on the body for enabling the air bubble to assume a position within the transparent vial. Based on the position of the air bubble in the transparent vial, the horizontal position and the inclined position of the body are determined. For example, if the air bubble is misaligned from a center portion of the transparent vial, the body is at the inclined position. Similarly, if the air bubble is aligned to the center portion of the transparent vial, the body is at the horizontal position.

If the air bubble is misaligned from the center portion of the transparent vial, the spirit level is tilted manually to align the air bubble to the center portion of the transparent vial. Furthermore, the deviation by which the spirit level is tilted in order to align the air bubble to the center portion is measured manually to determine an amount of shimming requisite to the body in order to position the body at the horizontal position. The term "shimming" as used herein is defined as a process in which a wedge is inserted to a structure, such as the body, in order to obtain the horizontal position, as opposed to the inclined position, of the structure with respect to a referenced plain.

However, such tilting of the spirit level and determination of the amount of shimming are associated with certain problems and drawbacks. For example, manual tilting of the spirit level for aligning the air bubble to the center portion of the transparent vial may be a time consuming and inconvenient exercise. Further, the amount of shimming requisite to the body is usually obtained by combination of the spirit level and a feeler gauge. Generally, the feeler gauge includes a plurality of blades that are interchangeably inserted beneath the spirit level until the air bubble is aligned at the center portion of the transparent vial, in order to measure the deviation. Such interchangeable insertion of the plurality of blades leads to misalignment of the spirit level on the body, thereby leading to incorrect readings of the deviation.

Accordingly, there exists a need for correctly measuring a deviation of a body in an easy and convenient manner for determining an amount of shimming requisite for the body in order to obtain a horizontal position as opposed to an inclined position of the body.

SUMMARY OF THE DISCLOSURE

In view of the foregoing disadvantages inherent in the prior art, the general purpose of the present disclosure is to provide a measuring device for measuring a deviation of a body to determine an amount of shimming requisite for the body, to include all advantages of the prior art, and to overcome the drawbacks inherent in the prior art.

An object of the present disclosure is to provide a measuring device capable of correctly measuring a deviation of a body, such as a machine surface, a base plate, a sole plate and the like, in an easy and convenient manner for determining an amount of shimming requisite for the body in order to obtain a horizontal position as opposed to an inclined position of the body.

In light of the above objects, in an aspect of the present disclosure a measuring device for measuring a deviation of a body to determine an amount of shimming requisite for the body is provided. The measuring device comprises an elongated member, a level indicating member, a gauge member and a jack screw member. The elongated member includes a first end portion and a second end portion opposite to the first end portion. The level indicating member is disposed on the elongated member between the first end portion and the second end portion. The gauge member is disposed at the first end portion of the elongated member. Further, the jack screw member is disposed adjacent to the gauge member on the first end portion of the elongated member. The jack screw member is capable of adjusting the elongated member until the level indicating member indicates a horizontal orientation of the elongated member on the body. Further, at the horizontal orientation of the elongated member on the body, the gauge member is capable of measuring the deviation of the body to determine the amount of shimming requisite for the body.

In another aspect of the present disclosure, a method for measuring a deviation of a body to determine an amount of shimming requisite for the body is provided. For measuring the deviation of the body, the measuring device is placed on the body. The measuring device comprises an elongated member, a level indicating member, a gauge member and a jack screw member. The elongated member includes a first end portion and a second end portion opposite to the first end portion. The level indicating member is disposed on the elongated member between the first end portion and the second end portion. The gauge member is disposed at the first end portion of the elongated member, and the jack screw member is disposed adjacent to the gauge member on the first end portion of the elongated member. Further, the jack screw member is maneuvered to adjust the elongated member until the level indicating member indicates a horizontal orientation of the elongated member of the measuring device placed on the body. Furthermore, the deviation of the body is measured by the gauge member to determine the amount of shimming requisite by the body, at the horizontal orientation of the elongated member on the body.

The measuring device, as disclosed, is capable of being placed on a body, such as a machine surface, a base plate, a sole plate and the like, for measuring a deviation of the body to determine an amount of shimming requisite for the body in order to obtain a horizontal position as opposed to an inclined position of the body. More specifically, the elongated member is placed on the body, and the jack screw member is maneuvered to adjust the elongated member until the level indicating member indicates the horizontal orientation as opposed to the inclined orientation of the elongated member. Thereafter, the gauge member correctly measures the deviation of the body for determining the amount of shimming requisite for the body in an easy and convenient manner.

These together with the other aspects of the present disclosure, along with the various features of novelty that characterized the present disclosure, are pointed out with particularity in the claims annexed hereto and form a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The term "first," "second," "top," "bottom," and the like, herein do not denote any order, elevation or importance, but rather are used to distinguish placement of one element over another. Further, the terms "a" and "an" herein do not denote a limitation of quantity, but rather denote the presence of at least one of the referenced item.

Figure 1:
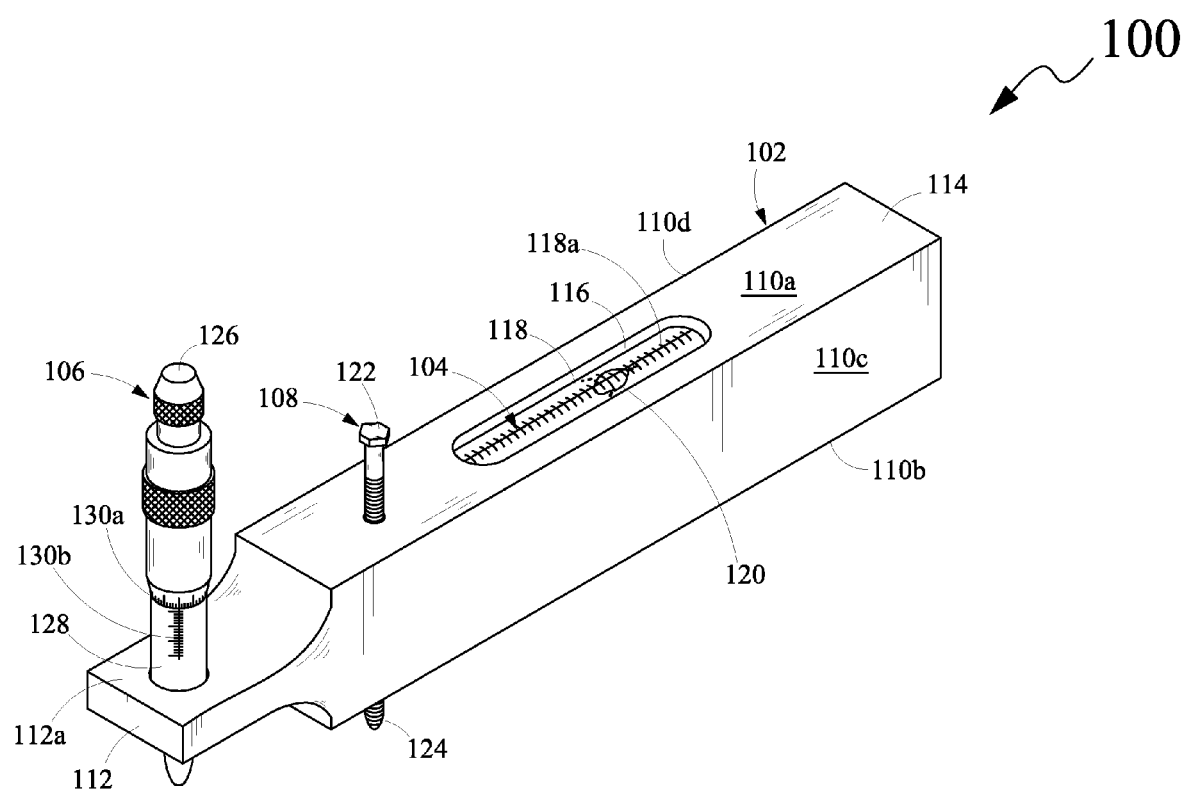
FIG. 1 illustrates a perspective view of a measuring device, in accordance with an embodiment of the present disclosure.
Figure 2:
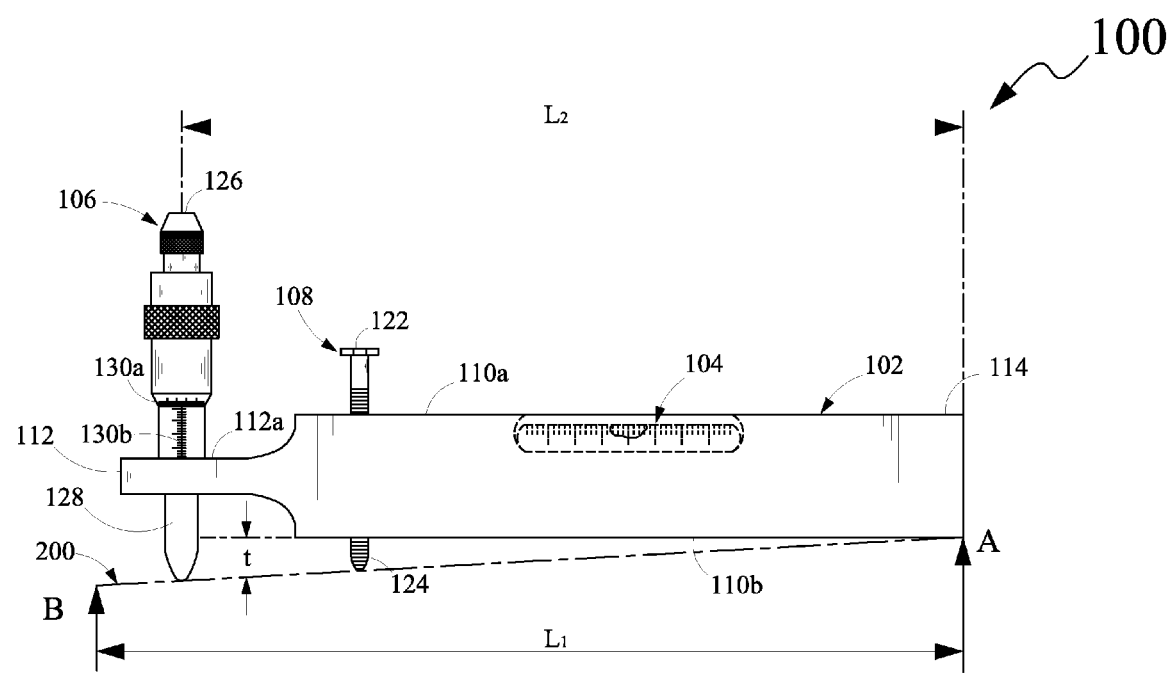
FIG. 2 illustrates a side view of the measuring device of FIG. 1 in a utilized state, in accordance with an embodiment of the present disclosure.

Referring now to FIGS. 1 and 2, a measuring device 100 is illustrated, in accordance with an embodiment of the present disclosure. More particularly, FIG. 1 illustrates a perspective view of the measuring device 100, and FIG. 2 illustrates a side view of the measuring device 100 in a utilized state. The measuring device 100 is utilized for measuring a deviation of a body 200 (shown in FIG. 2) to determine an amount of shimming requisite for the body 200 in order to obtain a horizontal position as opposed to an inclined position of the body 200. Examples of the body 200 may include, but not limited to, a machine surface, a base plate, a sole plate and the like. The measuring device 100 includes an elongated member 102, a level indicating member 104, a gauge member 106 and a jack screw member 108. The level indicating member 104, the gauge member 106 and the jack screw member 108 are disposed on the elongated member 102. The jack screw member 108 is capable of adjusting the elongated member 102 until the level indicating member 104 indicates a horizontal orientation as opposed to an inclined orientation of the elongated member 102 on the body 200. Further, at the horizontal orientation of the elongated member 102 on the body 200, the gauge member 106 is capable of measuring the deviation of the body to determine the amount of shimming requisite for the body 200 in order to obtain the horizontal position as opposed to the inclined position of the body 200. Upon measurement of the deviation of the body 200 at the horizontal orientation of the elongated member 102 on the body 200, the amount of shimming requisite for the body 200 is determined, and will be described in conjunction with FIG. 3.

As shown in FIGS. 1 and 2, the elongated member 102 includes a top surface 110a, a bottom surface 110b, a pair of opposite side surfaces, such as side surfaces 110c and 110d. The top surface 110a, the bottom surface 110b and the side surfaces 110c and 110d are configured to define the elongated member 102 of a rectangular shape. The elongated member 102 includes a first end portion 112 and a second end portion 114 opposite to the first end portion 112. At the first end portion 112 of the elongated member 102, the top surface 110a and the bottom surface 110b converge to form a narrow section 112a. The gauge member 106 is disposed at the narrow section 112a of the first end portion 112 of the elongated member 102. Further, adjacent to the gauge member 106, the jack screw member 108 is disposed at the first end portion 112 of the elongated member 102. Furthermore, the level indicating member 104 is disposed on the elongated member 102 between the first end portion 112 and the second end portion 114. More particularly, the elongated member 102 includes a groove 116 configured on the top surface 110a for receiving the level indicating member 104 therein. The level indicating member 104 is capable of indicating an orientation, such as the horizontal orientation and the inclined orientation, of the elongated member 102, when the measuring device 100 is placed on a body, such as the body 200.

The level indicating member 104 includes a transparent vial 118 partially filed with a colored liquid so that an air bubble 120 is formed within the transparent vial 118. The transparent vial 118 includes markings 118a configured on a surface thereof. The markings 118a on the transparent vial 118 help determine a position of the air bubble 120, which in turn determines the orientation, such as the horizontal orientation and the inclined orientation, of the elongated member 102. Further, based on the orientation of the elongated member 102, a position, such as the horizontal position or the inclined position, of a body on which the measuring device 100 is placed is determined. In one embodiment of the present disclosure, the level indicating member 104 is a spirit level indicator.

Further as shown in FIG. 2, the elongated member 102 is placed on its bottom surface 110b on a flat top surface of the body 200. Upon placing the elongated member 102 on the body 200, the air bubble 120 of the level indicating member 104 is capable of indicating the position of the body 200. The air bubble 120 (shown in FIG. 1) is adjusted within the transparent vial 118 depending upon the position of the body 200.

For example, if the air bubble 120 is aligned to the center portion of the markings 118a, then the body 200 is at the horizontal position. Further, if the air bubble 120 is misaligned from the center portion of the markings 118a, then the body 200 is at the inclined position, in which position a shimming is requisite. In FIG. 2, the body 200 is at the inclined position, in which the shimming is required. For determination of the amount of shimming requisite to the body 200, the elongated member 102 is adjusted via the jack screw member 108 until the air bubble 120 is aligned to the center portion of the markings 118a on the transparent vial 118.

As mentioned, the jack screw member 108 is disposed adjacent to the gauge member 106 on the first end portion 112 of the elongated member 102. The jack screw member 108 is capable of adjusting the elongated member 102 until the level indicating member 104 indicates the horizontal orientation of the elongated member 102 on the body 200. In the present embodiment of the disclosure, the jack screw member 108 includes a head portion 122 and a projecting portion 124 extending from the head portion 122. The projecting portion 124 passes from the top surface 110a to the bottom surface 110b of the elongated member 102 for being threadbly coupled with the elongated member 102. More specifically, the projecting portion 124 includes threads configured thereon. The projecting portion 124 passes from the top surface 110a to the bottom surface 110b through a threaded through hole (not shown) configured on the elongated member 102. The threads of the projecting portion 124 mesh with the threads of the threaded through hole for threadbly coupling with the elongated member 102. The jack screw member 108 is adjusted by maneuvering the head portion 122 for enabling the elongated member 102 to assume the horizontal orientation on the body 200. The jack screw member 108 may be adjusted by a conventional wrench. Further, upon adjustment of the jack screw member 108, the gauge member 106 may be employed for measuring the deviation of the body 200 at the horizontal orientation of the elongated member 102 on the body 200.

The gauge member 106 is disposed at the narrow section 112a of the elongated member 102. The gauge member 106 includes a knob 126 and a leg 128. Both the knob 126 and the leg 128 include markings 130a and 130b, respectively configured thereon. The knob 126 is maneuvered for enabling the leg 128 to move back and forth from the knob 126. An amount of movement of the leg 128 may be observed from the markings 130a and 130b configured on the knob 126 and the leg 128, respectively. According to one embodiment of the present disclosure, the gauge member 106 is a micrometer.

In the present embodiment of the disclosure, at the horizontal orientation of the elongated member 102 on the body 200, the knob 126 is maneuvered for moving the leg 128 to reach top surface of the body 200 for determining the deviation of the body 200 that has been adjusted by the jack screw member 108 in order to position the elongated member 102 at the horizontal orientation. Upon measuring the deviation, the amount of shimming may be determined, and will be described with respect to FIG. 3.

Figure 3:
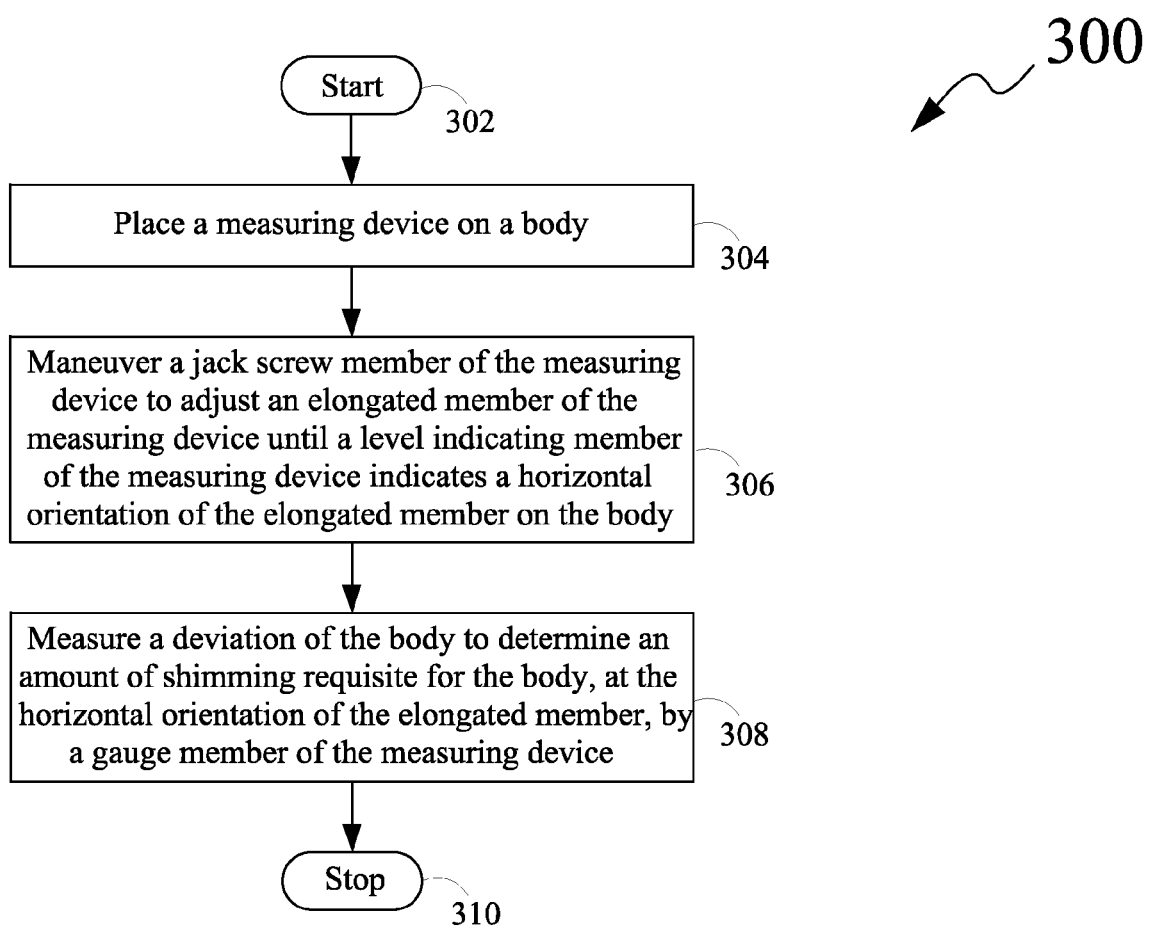
FIG. 3 illustrates a flow diagram of a method of using the measuring device of FIGS. 1 and 2, in accordance with an embodiment of the present disclosure.

Referring now to FIG. 3, a flow diagram of a method 300 is illustrated, according to an exemplary embodiment of the present disclosure. Herein, references will be made to the previous figures to describe the method 300. The flow diagram describes the method 300 for measuring the deviation of the body 200 to determine the amount of shimming requisite to the body 200.

The method 300 as shown by the flow diagram starts at 302. At 304, the measuring device 100 is placed on the body 200. The measuring device 100 that is provided over the body 200 has been described in conjunction with FIGS. 1 and 2. For the sake of brevity, the description of the measuring device 100 has not been included herein. Further at 306, the jack screw member 108 is maneuvered to adjust the elongated member 102 until the level indicating member 104 indicates the horizontal orientation of the elongated member 102 on the body 200. Furthermore at 308, measurement of the deviation of the body 200 by the gauge member 106 is obtained at the horizontal orientation of the elongated member 102. Particularly at 308, the knob 126 of the gauge member 106 is maneuvered to move the leg 128 of the gauge member 106 to reach at a top surface of the body 200. Accordingly, markings 130a and 103b configured on the knob 126 and the leg 128 of the gauge member 106, respectively, enable measurement of the deviation of the body 200.

Moreover, upon measuring the deviation of the body 200 by the gauge member 106, at the horizontal orientation of the elongated member 102, the amount of shimming requisite for the body 200 is determined in order to obtain the horizontal position of the body 200. Determination of the amount of shimming requisite for the body 200, is based on a length of the elongated member 102 up to the gauge member 106, a distance between a reference point "A" and a shimming point "B" (as shown in FIG. 2) of the body 200, and the deviation of the body 200 at the horizontal orientation of the of the elongated member 102 on the body 200.

More particularly, the length of the elongated member 102 up to the gauge member 106 is measured. Further, a distance between the reference point "A" and the shimming point "B" is measured. According to an embodiment of the present disclosure, the reference point "A" is a point on the body 200 where the second end portion 114 of the elongated member 102 rests (as shown in FIG. 2). Further, the shimming point "B" is a point on the body 200 from where the body 200 may be lifted (as shown in FIG. 2). Furthermore, the shimming point "B" may also be a point where the shimming may be provided. The reference point "A" may be at a higher inclination with respect to the shimming point B.

Accordingly, a ratio of the length of the elongated member 102 and the distance between the reference point "A" and the shimming point "B" is obtained and is multiplied by a measured value of the deviation obtained by the measuring device 100. Value obtained by above steps is the amount of the shimming requisite for the body 200 in order to obtain the horizontal position of the body 200. Specifically, below mentioned expression may be used for determination of the amount of the shimming requisite for the body 200 in order to obtain the horizontal position of the body 200.

$$A_{shim} = t*(L1/L2)$$

In the above expression, "t" is the deviation measured by the measuring device 100, "L2" is the length of the elongated member 102 up to the gauge member 106, and "L1" is the distance between the reference point "A" and the shimming point "B." Furthermore, "$A_{shim}$" is the amount of the shimming requisite for the body 200 in order to obtain the horizontal position of the body 200. Moreover, the method 300 stops at 310.

In one embodiment of the present disclosure, the measuring device 100 as described above for measuring the deviation is composed of a corrosion resistant material. More particularly, the elongated member 102, the gauge member 106 and the jack screw member 108 are composed of the corrosion resistant material.

The present disclosure provides following advantages in light of a measuring device, such as the measuring device 100, and a method, such as the method 300. The measuring device is capable of correctly determining a deviation of the body, such as a machine surface, a base plate, a sole plate and the like, for measuring an amount of shimming requisite for the body in order to obtain a horizontal position of the body. The measuring device is capable of providing accurate measurement in a convenient manner and in timely fashion. Further, the method steps are easy to perform for accurately measuring the amount of shimming requisite for the body.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A measuring device for measuring a deviation of a body to determine an amount of shimming requisite for the body, the measuring device comprising:
   an elongated member having a first end portion and a second end portion opposite to the first end portion, said first end portion comprising a narrow section, the elongated member capable of being placed on the body;
   a level indicating member disposed on the elongated member between the first end portion and the second end portion;
   a movable gauge member disposed at the narrow section of said first end portion of the elongated member; and
   a jack screw member disposed adjacent to but separate from the gauge member on the first end portion of the elongated member,
   wherein the jack screw member is capable of adjusting the elongated member until the level indicating member indicates a horizontal orientation of the elongated member on the body, and,
   wherein at the horizontal orientation of the elongated member on the body, the gauge member is capable of measuring the deviation of the body to determine the amount of shimming requisite for the body.

2. The measuring device of claim 1, wherein the elongated member comprises a groove configured on a top surface of the elongated member for receiving the level indicating member therein.

3. The measuring device of claim 1, wherein jack screw member comprises
   a head portion; and
   a projecting portion extending from the head portion, the projecting portion threadably coupled with the elongated member,
   wherein the projecting portion is adjusted on the elongated member by maneuvering the head portion for enabling the elongated member to assume the horizontal orientation on the body.

4. The measuring device of claim 1, wherein the gauge member is a micrometer.

5. The measuring device of claim 1, wherein the level indicating member is a spirit level indicator.

6. A method for measuring a deviation of a body to determine an amount of shimming requisite for the body, the method comprising;
   placing a measuring device on the body, the measuring device comprising,
      an elongated member having a first end portion and a second end portion opposite to the first end portion, said first end portion comprising a narrow section, the elongated member capable of being placed on the body,
      a level indicating member disposed on the elongated member between the first end portion and the second end portion,
      a movable gauge member disposed at the narrow section of said first end portion of the elongated member, and
      a jack screw member disposed adjacent to but separate from the gauge member on the first end portion of the elongated member;
   maneuvering the jack screw member to adjust the elongated member until the level indicating member indicates a horizontal orientation of the elongated member on the body; and
   measuring the deviation of the body to determine the amount of shimming requisite for the body, at the horizontal orientation of the elongated member, by the gauge member.

* * * * *